(12) United States Patent
Deng et al.

(10) Patent No.: US 11,400,927 B2
(45) Date of Patent: Aug. 2, 2022

(54) COLLISION AVOIDANCE AND MITIGATION

(71) Applicant: Ford Global Technologies, LLC, Dearborn, MI (US)

(72) Inventors: Kun Deng, Ann Arbor, MI (US); Nanjun Liu, Ann Arbor, MI (US); Fangjun Jiang, Northville, MI (US); Gary Song, Canton, MI (US); Alex Maurice Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 453 days.

(21) Appl. No.: 15/881,999

(22) Filed: Jan. 29, 2018

(65) Prior Publication Data
US 2019/0232958 A1    Aug. 1, 2019

(51) Int. Cl.
*B60W 30/095* (2012.01)
*B60T 7/18* (2006.01)
*B60T 7/22* (2006.01)

(52) U.S. Cl.
CPC ..... *B60W 30/0953* (2013.01); *B60W 2520/10* (2013.01); *B60W 2520/14* (2013.01); *B60W 2540/18* (2013.01); *B60W 2554/80* (2020.02); *B60W 2554/806* (2020.02)

(58) Field of Classification Search
CPC .................................................. B60W 30/0953
See application file for complete search history.

(56) References Cited

U.S. PATENT DOCUMENTS

| | | | |
|---|---|---|---|
| 6,624,782 B2 | 9/2003 | Jocoy et al. | |
| 9,598,009 B2 | 3/2017 | Christensen et al. | |
| 9,688,273 B2 | 6/2017 | Mudalige et al. | |
| 9,751,506 B2 | 9/2017 | Mudalige et al. | |
| 10,011,281 B1* | 7/2018 | Kang | B60W 30/18163 |
| 2001/0027388 A1* | 10/2001 | Beverina | G06Q 20/203 703/22 |
| 2007/0239408 A1* | 10/2007 | Manges | G06N 5/025 703/2 |
| 2009/0192675 A1* | 7/2009 | Yamakado | B60T 8/1755 701/38 |
| 2011/0264302 A1* | 10/2011 | Tsunekawa | B60W 40/072 701/1 |
| 2014/0336844 A1* | 11/2014 | Schwindt | B60W 50/0097 701/1 |
| 2015/0039212 A1* | 2/2015 | Kido | G08G 1/166 701/117 |
| 2016/0314360 A1* | 10/2016 | Kizumi | G06K 9/00798 |
| 2016/0368492 A1* | 12/2016 | Al-Stouhi | B60W 30/18154 |
| 2017/0057499 A1* | 3/2017 | Kim | B60Q 9/008 |

(Continued)

FOREIGN PATENT DOCUMENTS

CN       107248320 A    10/2017
WO    WO-2017179391 A1 * 10/2017 ............. B62D 5/006

*Primary Examiner* — Christian Chace
*Assistant Examiner* — Amelia Vorce
(74) *Attorney, Agent, or Firm* — Frank A. MacKenzie; Bejin Bieneman PLC

(57) ABSTRACT

A system includes a computer including a processor and a memory, the memory storing instructions executable by the processor to determine respective threat numbers for each of a plurality of targets based on an angular acceleration of a host vehicle and actuate a component in the host vehicle based on the threat numbers.

20 Claims, 11 Drawing Sheets

(56) References Cited

U.S. PATENT DOCUMENTS

| | | | |
|---|---|---|---|
| 2017/0061797 A1* | 3/2017 | Lee | B60K 31/0008 |
| 2018/0056995 A1* | 3/2018 | Deng | B62D 15/025 |
| 2018/0099665 A1* | 4/2018 | You | B60Q 9/008 |
| 2018/0118200 A1* | 5/2018 | Yamaguchi | B62D 6/00 |
| 2018/0182247 A1* | 6/2018 | Baba | G06K 9/00791 |
| 2018/0194347 A1* | 7/2018 | Nakagawa | B60T 7/12 |
| 2019/0054916 A1* | 2/2019 | Akiyama | B62D 5/006 |
| 2020/0039481 A1* | 2/2020 | Aitidis | B60W 40/02 |
| 2021/0403006 A1* | 12/2021 | Books | B60W 30/18063 |

\* cited by examiner

COLLISION AVOIDANCE AND MITIGATION

BACKGROUND

Vehicle collisions often occur at intersections. Collision mitigation between a host vehicle and a target may be difficult and expensive to implement. For example, determining a threat assessment indicating a probability of a collision between the target and the host vehicle may require data from a plurality of sensors. Furthermore, performing the threat assessment for several targets can require significant computing resources, especially when certain targets in certain intersections may have a lower risk of a collision. Unfortunately, technology is lacking to reduce certain costly computing expenditures associated with target threat assessment. For example, the present inventors have recognized that present technology suffers from inefficiencies because it is lacking with respect to identifying targets moving near a vehicle in an intersection for which a threat assessment need not be performed.

DETAILED DESCRIPTION

Figure 1:
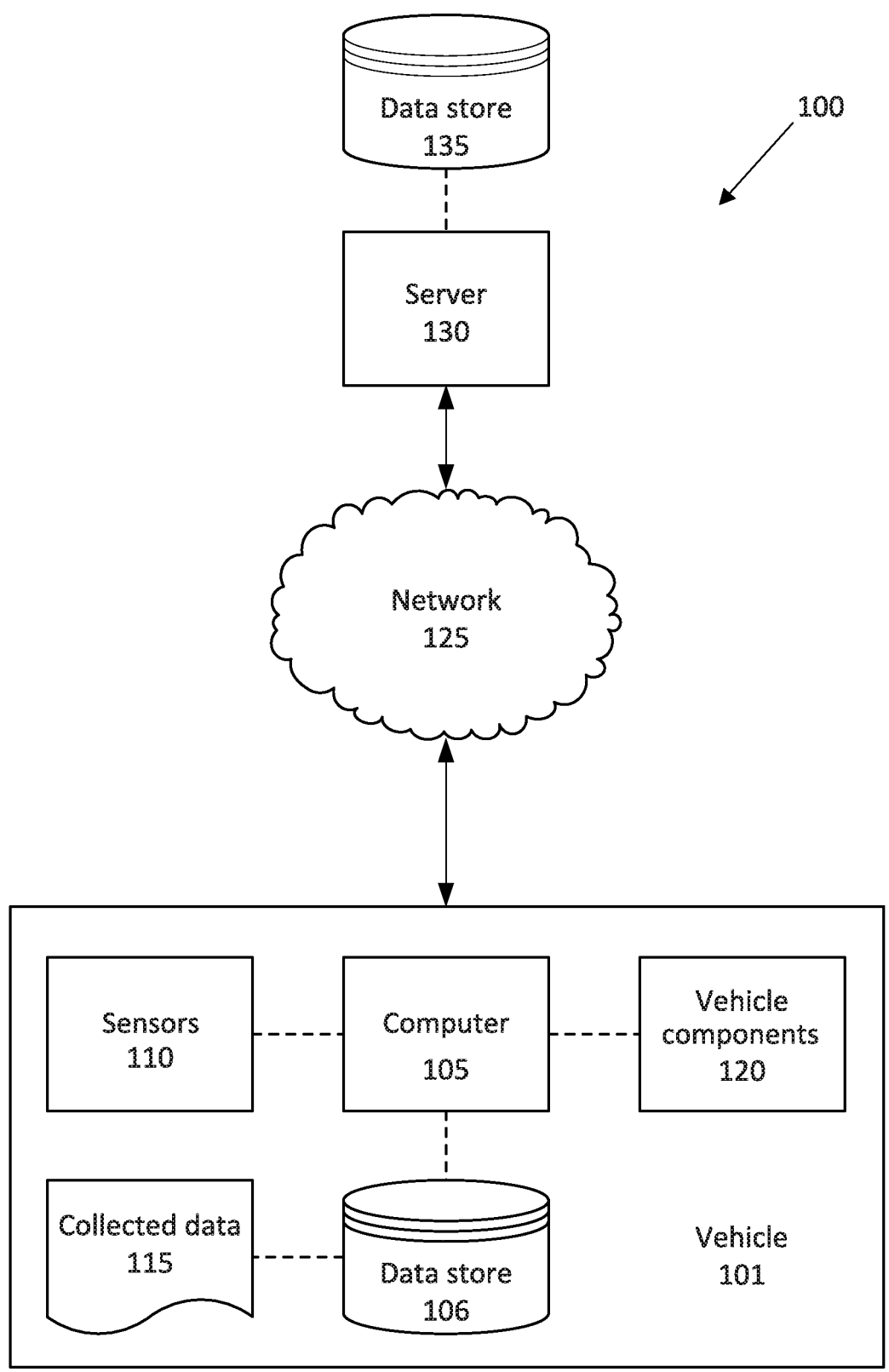
FIG. 1 is a block diagram of an example system for collision avoidance and mitigation.

A system includes a computer including a processor and a memory, the memory storing instructions executable by the processor to determine respective threat numbers for each of a plurality of targets based on an angular acceleration of a host vehicle and actuate a component in the host vehicle based on the threat numbers.

The instructions can further include instructions to determine the threat number for each of the targets based on an angular speed of the host vehicle. The instructions can further include instructions to determine the threat number for each of the targets based on a forward speed of the host vehicle and the angular speed. The instructions can further include instructions to determine that the host vehicle is leaving a current roadway lane based on the forward speed and the angular speed.

The instructions can further include instructions to determine the threat number for each of the targets based on at least one of a target heading angle of the respective target and a target heading angle rate of the respective target.

The instructions can further include instructions to actuate a brake in the host vehicle when the threat number is above a threat number threshold.

The instructions can further include instructions to determine the threat number for each of the targets based on a steering wheel angle of the host vehicle.

The instructions can further include instructions to determine the threat number for at least one of the targets when a sign of a first value of the angular acceleration differs from a sign of a subsequent value of the angular acceleration.

A system includes a host vehicle, means for determining respective threat numbers for each of a plurality of targets based on an angular acceleration of the host vehicle, and means for braking the host vehicle based on the threat numbers.

The system can further include means for determining the threat number for each of the targets based on an angular speed of the host vehicle. The system can further include means for determining the threat number for each of the targets based on a forward speed of the host vehicle and the angular speed. The system can further include means for determining that the host vehicle is leaving a current roadway lane based on the forward speed and the angular speed.

A method includes determining respective threat numbers for each of a plurality of targets based on an angular acceleration of a host vehicle and actuating a component in the host vehicle based on the threat numbers.

The method can further include determining the threat number for each of the targets based on an angular speed of the host vehicle. The method can further include determining the threat number for each of the targets based on a forward speed of the host vehicle and the angular speed. The method can further include determining that the host vehicle is leaving a current roadway lane based on the forward speed and the angular speed.

The method can further include determining the threat number for each of the targets based on at least one of a respective target heading angle for the respective target and a target heading angle rate of the respective target.

The method can further include actuating a brake in the host vehicle when the threat number is above a threat number threshold.

The method can further include determining the threat number for each of the targets based on a steering wheel angle of the host vehicle.

The method can further include determining the threat number for at least one of the targets when a sign of a first value of the angular acceleration differs from a sign of a subsequent value of the angular acceleration.

Further disclosed is a computer programmed to execute any of the above method steps. Yet further disclosed is a vehicle comprising the computer. Yet further disclosed is a computer program product, comprising a computer readable medium storing instructions executable by a computer processor, to execute any of the above method steps.

In an intersection, a computer in a vehicle can detect a plurality of targets moving toward the vehicle and actuate components to avoid and/or mitigate collisions with the targets. Typically, not all targets in an intersection have a high enough probability of a collision with the host vehicle to warrant extensive threat analysis and consideration. Threat analysis can then be performed on the targets selected for the reduced set, and the vehicle can then be operated based on the threat analysis of the selected targets. The computer can collect data about the targets and the host vehicle and, based on the collected data, reduce the total number of targets to consider for extensive threat analysis. Thus, by focusing only on targets most likely to collide with the host vehicle, computing resources can be conserved and thereby made available for other purposes and/or the computer can operate more efficiently, e.g., make threat assessments in less time and/or by consuming fewer resources, such as processor cycles, memory, network bandwidth, etc.

FIG. 1 illustrates an example system 100 for collision avoidance and mitigation. Unless indicated otherwise in this disclosure, an "intersection" is defined as a location where two or more vehicles' current or potential future trajectories cross. Thus, an intersection could be at any location on a surface where two or more vehicles could collide, e.g. a road, a driveway, a parking lot, an entrance to a public road, driving paths, etc. Accordingly, an intersection is determined by identifying a location where two or more vehicles may meet, i.e., collide. Such determination uses potential future trajectories of a host vehicle 101 as well as nearby other vehicles and/or other objects.

A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
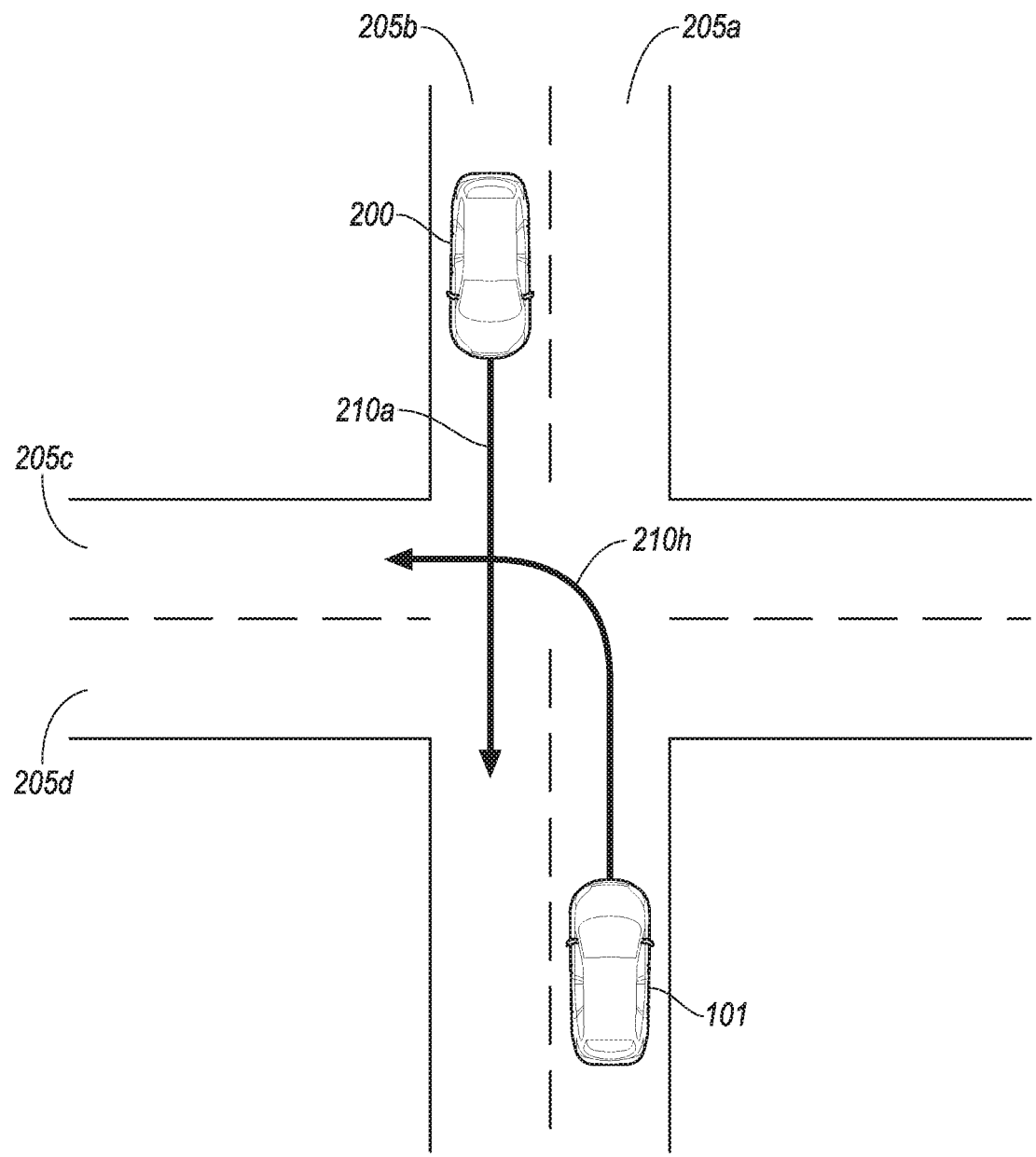
FIG. 2 illustrates an example intersection with a host vehicle and a target.

FIG. 2 illustrates an example host vehicle 101 in an intersection with an example target 200 (in this example, a second vehicle 101) that can cross the path of the host vehicle 101 in an intersection on a roadway. The target 200 can be, e.g., another vehicle 101, a bicycle, an obstacle, etc. The roadway includes a plurality of roadway lanes 205, including the roadway lanes 205a, 205b, 205c, 205d. FIG. 2 illustrates an oncoming turn-across path (OCTAP) intersection, in which the host vehicle 101 has a projected path 210h that crosses a projected path 210a of the target 200. As used herein, a "projected path" is a predicted set of points over which the host vehicle 101 or target 200 will follow based on one or more elements of the host vehicle 101 or target 200 trajectory, e.g., a speed, a direction of travel, a position, an acceleration, etc. As used herein, a "turn" is a projected path 210h that extends from a first roadway lane 205 into a second roadway lane 205 that in many examples is substantially perpendicular to the first roadway lane 205, e.g., from the roadway lane 205a to the roadway lane 205c.

A host vehicle 101 making a left-hand turn on a 2-way right-hand driving roadway will move the host vehicle 101 across lanes where targets 200 can move opposite to the direction of the host vehicle 101 before making the left-hand turn. That is, the host vehicle 101 in a left-hand turn has to cross lanes 205 where targets 200 move toward the host vehicle 101 in the intersection, increasing a probability of a collision. The computer 105 can be programmed to actuate one or more components 120 in an OCTAP intersection to avoid and/or mitigate a collision with the targets 200.

Figure 3A:
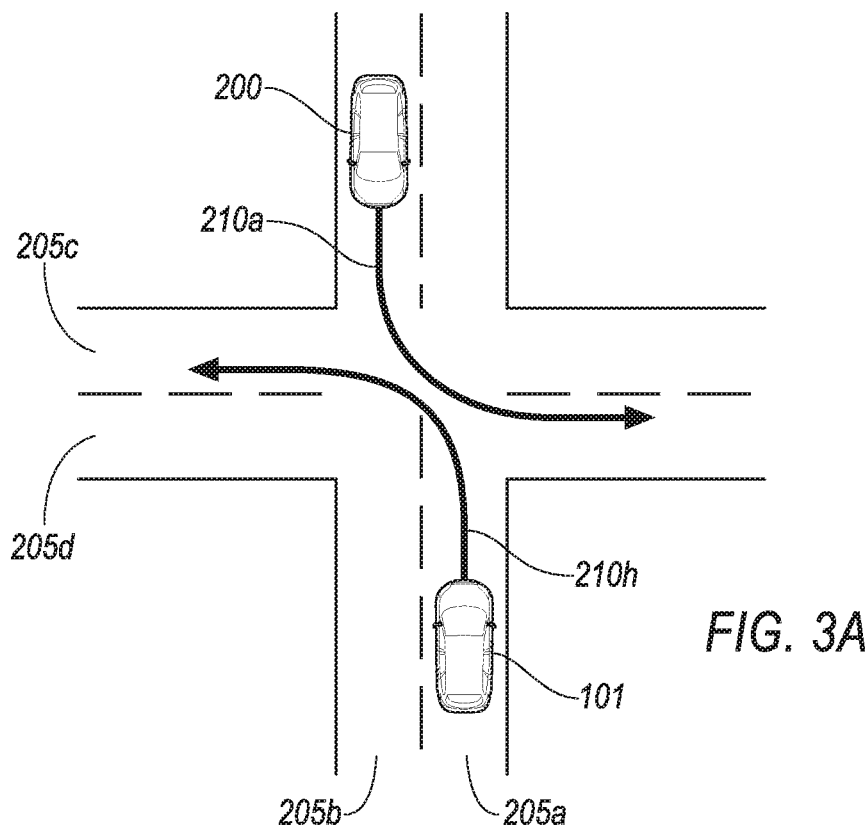
FIGS. 3A-3F illustrate example intersections with the host vehicle.

When the host vehicle 101 is not in an OCTAP intersection, the computer 105 can determine not to perform a threat assessment on detected targets 200 and not to actuate one or more components 120 to avoid or mitigate a collision with the detected targets 200. FIGS. 3A-3F illustrate a plurality of example intersections in which the host vehicle 101 is at a lower risk of a collision with the target 200 than in an OCTAP intersection. In intersections that are not OCTAP intersections, not all targets 200 warrant extensive threat estimation. For example, as shown in FIG. 3A, the example path 210h of the host vehicle 101 does not cross the example path 210a of the target 200, and the computer 105 should not perform a threat assessment on the target 200. As described below, the computer 105 can determine one or more indicators that indicate whether the host vehicle 101 is in an intersection that is not an OCTAP intersection.

FIG. 3A illustrates an example intersection in which a target 200 is turning away from the host vehicle 101. The host vehicle 101 has an example path 210h that extends from the roadway lane 205a, the current position of the host vehicle 101, to the roadway lane 205c, i.e., a left-hand turn. The target 200 has an example path 210a that extends from the roadway lane 205b, the current position of the target 200, to the roadway lane 205d. In the example of FIG. 3A, the risk of a collision between the host vehicle 101 and the target 200 is low because the example paths 210h, 210a do not cross, and thus the computer 105 can determine not to perform extensive threat analysis on the target 200.

Figure 3B:
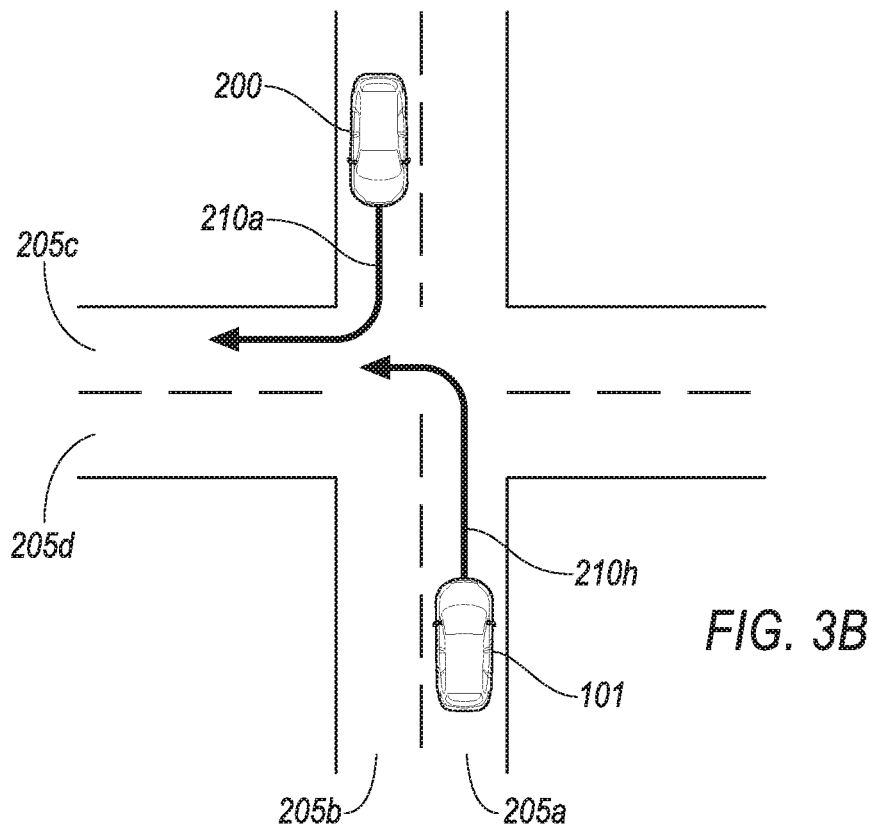

FIG. 3B illustrates an example intersection in which a target 200 and the host vehicle 101 are turning into the same roadway lane 205. The host vehicle 101 has an example path 210h that extends from the roadway lane 205a, the current position of the host vehicle 101, to the roadway lane 205c, i.e., a left-hand turn. The target 200 has an example path 210a that extends from the roadway lane 205b, the current position of the target 200, to the roadway lane 205c. The example path 210a of target 200 can indicate that the target 200 will move into the roadway lane 205c before the host vehicle 101, and the risk of a collision between the host vehicle 101 and the target 200 is low. Thus, the computer 105 can determine not to perform extensive threat analysis on the target 200.

Figure 3C:
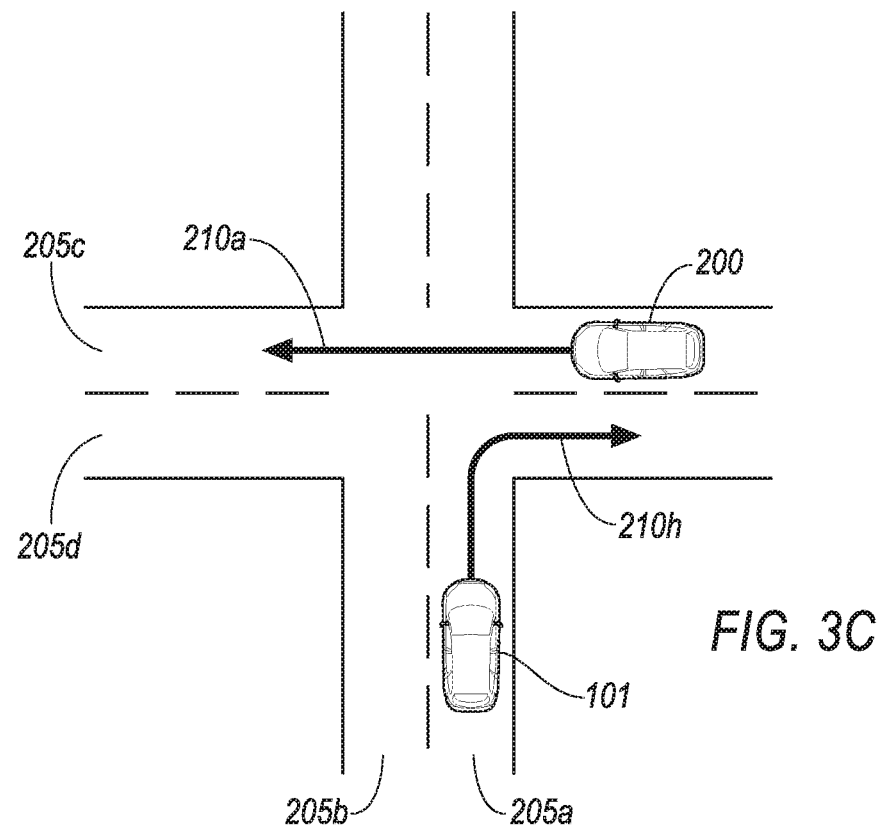

FIG. 3C illustrates an example intersection in which a target 200 is moving in an opposing roadway lane 205 from a turning host vehicle 101. The host vehicle 101 has an example path 210h that extends from the roadway lane 205a, the current position of the host vehicle 101, to the roadway lane 205d, i.e., a right-hand turn. The target 200 has an example path 210a that extends along the roadway lane 205c. The computer 105 can detect the oncoming target 200 and determine whether to perform a threat analysis on the target 200 and actuate components 120 to avoid the target 200. Because the example paths 210h, 210a do not cross, the risk of a collision between the host vehicle 101 and the target 200 is low. Thus, the computer 105 can determine not to perform extensive threat analysis on the target 200.

Figure 3D:
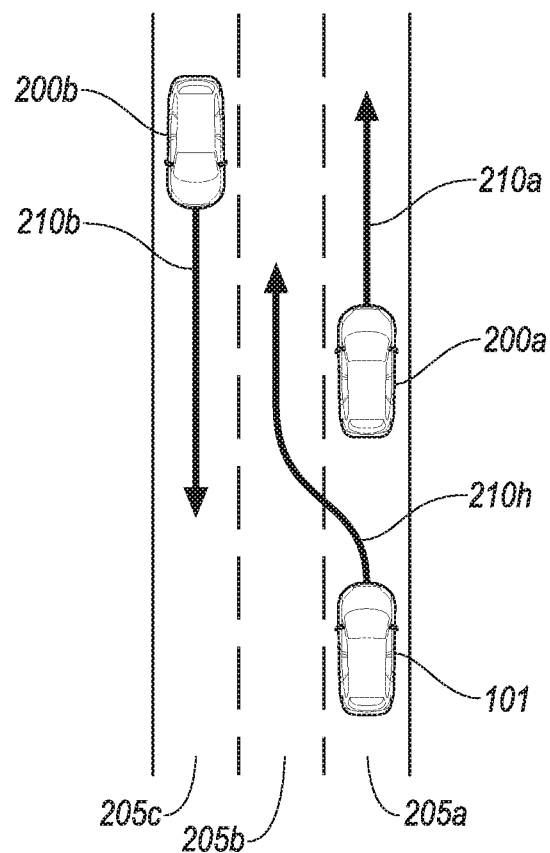

FIG. 3D illustrates an example intersection in which a host vehicle 101, a first target 200a, and a second target 200b are traveling in roadway lanes 205a, 205b, 205c. The first target 200a moves along an example path 210a in the roadway lane 205a. The second target 200b moves along an example path 210b in the roadway lane 205c. The host vehicle 101 moves along an example path 210h from the roadway lane 205a to the roadway lane 205b. The computer 105 can detect the oncoming second target 200b. The risk of a collision between the host vehicle 101 and either of the first target 200a or the second target 200b is low, at least because the example paths 210h, 210a, and 210b do not cross. Furthermore, the computer 105 can determine that the risk of a collision between the host vehicle 101 and the targets 200a, 200b is low based on other data 115, e.g., based on a distance between the host vehicle 101 and each of the targets 200a, 200b. Thus, the computer 105 can determine not to perform extensive threat analysis on either the first target 200a or the second target 200b.

Figure 3E:
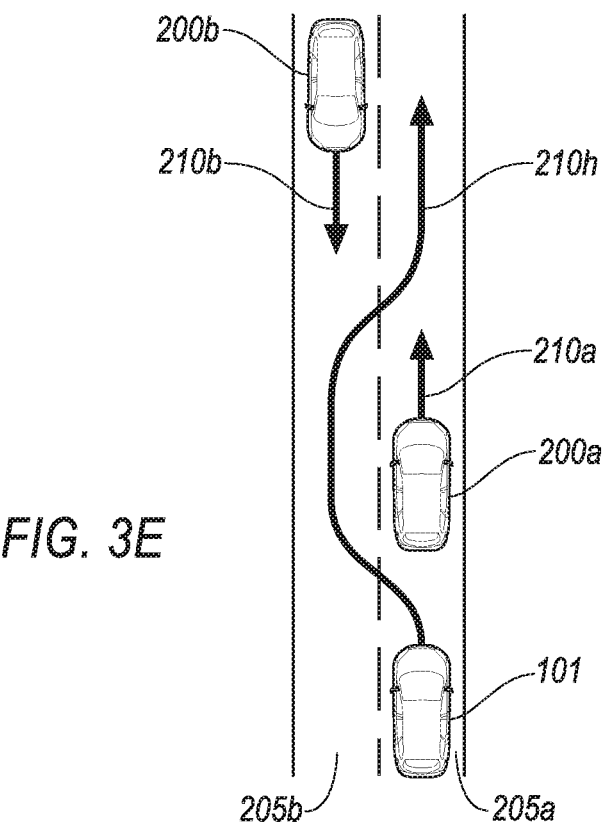

FIG. 3E illustrates an example intersection in which a host vehicle 101, a first target 200a, and a second target 200b are traveling in roadway lanes 205a, 205b. The host vehicle 101 and the first target 200a are in the roadway lane 205a. The host vehicle 101 can move along an example path 210h, and the first target 200a can move along an example path 210a. The second target 200b is moving opposite the host vehicle 101 in the roadway lane 205b along an example path 210b. The example path 210h that extends from the roadway lane 205a, into the roadway lane 205b (to pass the target 200a), and back into the roadway lane 205a ahead of the target 200a. FIG. 3E shows an "overtake" intersection, in which the host vehicle 101 passes from behind the target 200a to a position in front of the target 200a by passing through an adjacent roadway lane 205.

The computer 105 can detect the oncoming second target 200b. Because the host vehicle 101, following the example path 210h, can return to the roadway lane 205a before the second target 200b reaches the position of the host vehicle 101 when the host vehicle 101 is in the roadway lane 205b, the risk of a collision between the host vehicle 101 and either of the first target 200a and the second target 200b is low. Thus, the computer 105 can determine not to perform extensive threat analysis on either the first target 200a or the second target 200b.

Figure 3F:
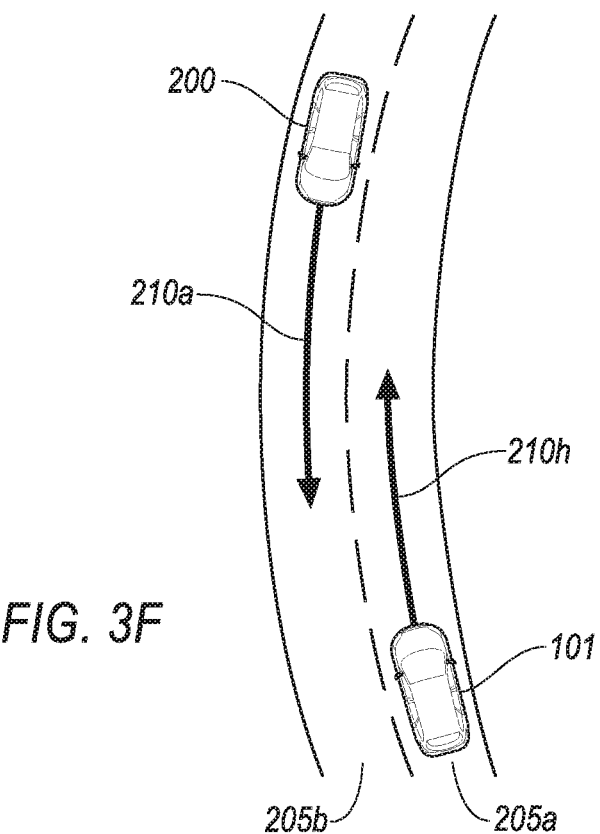

FIG. 3F illustrates an example intersection in which a host vehicle 101 and a target 200 are traveling in roadway lanes 205a, 205b. The roadway lanes 205a, 205b curve, and the computer 105 can determine that the host vehicle 101 is in a turn and that threat analysis of the target 200 should be performed. The host vehicle 101 can follow an example path 210h in the roadway lane 205a, and the target 200 can follow an example path 210a in the roadway lane 205b. The computer 105 can detect the target 200 and determine whether to perform extensive threat analysis and actuate one or more components 120 to avoid the target 200. The risk of a collision between the host vehicle 101 and the target 200 is low at least because the host vehicle 101 and the target 200 remain in their respective roadway lanes 205a, 205b. Thus, the computer 105 can determine not to perform extensive threat analysis on the target 200.

Figure 4:
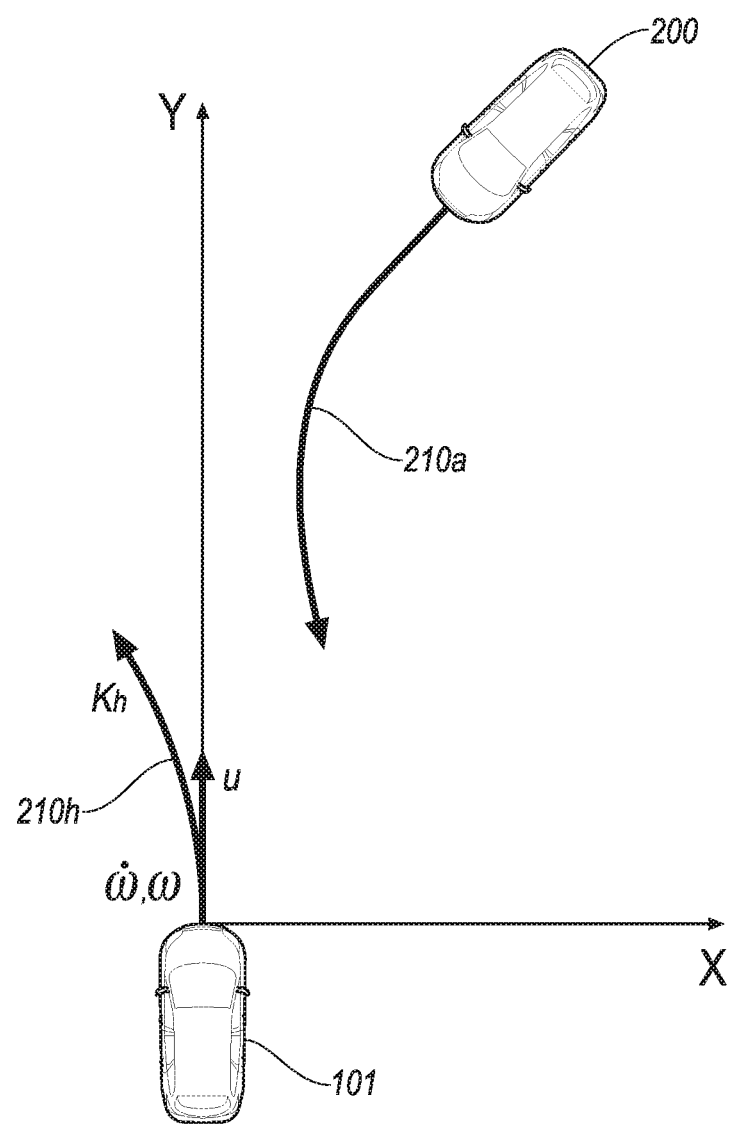
FIG. 4 is an example diagram of measurements taken by the host vehicle between the host vehicle and the target.

FIG. 4 illustrates parameters based on data 115 measured by the sensors 110 of the host vehicle 101 and one example target 200 as determined by the computer 105. The data 115 collected by the sensors 110 can include, e.g., a position, a speed, an acceleration, a trajectory, etc. of the host vehicle 101. The host vehicle 101 has a projected path 210h, and the target 200 has a projected path 210a, as described above. The host vehicle 101 can define an origin at a center point of a front end of the host vehicle 101. The computer 105 can define a rectangular coordinate system based on the origin. The computer 105 can use the origin to specify the position, speed, and/or acceleration of the host vehicle 101 and the target 200.

The rectangular coordinates start at the origin of the host vehicle 101 and are specified according to orthogonal directions: a lateral direction, designated with the label X, and a longitudinal direction, designated with the label Y. The computer 105 can predict the position, speed, and acceleration of the host vehicle 101 and the target vehicle in the rectangular coordinates.

The host vehicle 101 has a forward speed that can be denoted u. The forward speed u is a change in position of the host vehicle 101 along the projected path 210h. The computer 105 can determine the forward speed u based on a sensor 110, e.g., a speedometer. The forward speed u has units of distance per time, e.g., meters per second (m/s), miles per hour (mph), etc.

The host vehicle 101 can have an angular speed ω. The angular speed ω is a change in value of an angle relative to the longitudinal axis Y in the plane of the lateral axis X and the longitudinal axis Y. The angular speed ω has units of angle per time, e.g., radians per second (rad/s), degrees per second (deg/sec), etc. The computer 105 can determine the angular speed ω with a sensor 110, e.g., a gyroscope.

The host vehicle 101 can have an angular acceleration $\dot{\omega}$. The angular acceleration $\dot{\omega}$ is a change in the angular speed ω over a period of time, i.e., $$\dot{\omega} = \frac{d\omega}{dt}.$$

The angular acceleration $\dot{\omega}$ has units of angle per time squared, e.g., radians per second squared (rad/sec²), degrees per second squared (deg/sec²), etc. The computer 105 can determine the angular acceleration $\dot{\omega}$ based on the angular speed ω and a time elapsed between measurements of the angular speed ω.

The computer 105 can determine the angular speed ω as a yaw rate. As used herein, "yaw" is a movement around an axis normal to a horizontal plane (an example is the X-Y plane in FIG. 4) that changes the direction of the vehicle 101, e.g., to the left or right of the direction that the vehicle 101 is heading. The angular speed ω can be a rate at which the host vehicle 101 moves in the yaw direction.

The computer 105 can determine a steering wheel angle θ. The steering wheel angle θ is an angle of a host vehicle 101 steering wheel (not shown) relative to a central axis (e.g., an axis of a steering column) in the host vehicle 101. A host vehicle 101 user can turn the steering wheel, and the computer 105 can determine the steering wheel angle θ based on, e.g., a steering wheel sensor 110.

The computer 105 can determine a steering ratio $r_s$. The steering ratio $r_s$ is the ratio of the steering wheel angle θ, as described above, and a steering angle α of the host vehicle 101 resulting from moving the steering wheel to the steering wheel angle θ. Moving the steering wheel to the steering wheel angle θ turns a steering column and one or more components 120 to turn one or more wheels to the steering angle α, the steering angle α being the angle between the wheel and a front end of the vehicle 101. The steering ratio $r_s$ can thus be defined as $r_s=\theta/\alpha$. For example, a steering ratio $r_s$ of 7.5 means that when the user rotates the steering wheel 150 degrees (i.e., θ=150°), the steering angle α changes 20 degrees.

The host vehicle 101 has a wheelbase d. The wheelbase d is a distance between a front axle and a rear axle of the host vehicle 101. The wheelbase d can be a predetermined value measured by, e.g., a service worker, and stored in the data store 106 and/or the server 130.

The computer 105 can determine a curvature $K_h$ of the host vehicle 101 trajectory at a time t. The curvature $K_h$ is a measure of a radius of curvature of the host vehicle 101 trajectory along the projected path 210h. The curvature $K_h$ has units of reciprocal length, e.g., 1/m, reciprocal meters. The curvature $K_h$ can be determined according to one of two example formulas:

$$K_h(t) = \frac{\omega(t)}{u(t)} \quad (1)$$

$$K_h(t) = \frac{\sin\left(\frac{\theta(t)}{r_s}\right)}{d} \quad (2)$$

The computer 105 can determine the curvature $K_h$ according to Equation 1 when the forward speed u is above a predetermined forward speed threshold and according to Equation 2 when the forward speed u is below the predetermined forward speed threshold. The forward speed threshold can be 2.2 meter/sec (corresponding to 5 mile per hour), a speed threshold below which the division operation in Equation 1 could be inaccurate or approaches division by zero. The forward speed threshold can be determined based on, e.g., empirical data correlating a forward speed u of the host vehicle 101 to measurements of the curvature $K_h$. Based on the curvature $K_h$ and the change in the curvature $K_h$, the computer 105 can determine whether the host vehicle 101 is in an OCTAP intersection.

Figure 5:
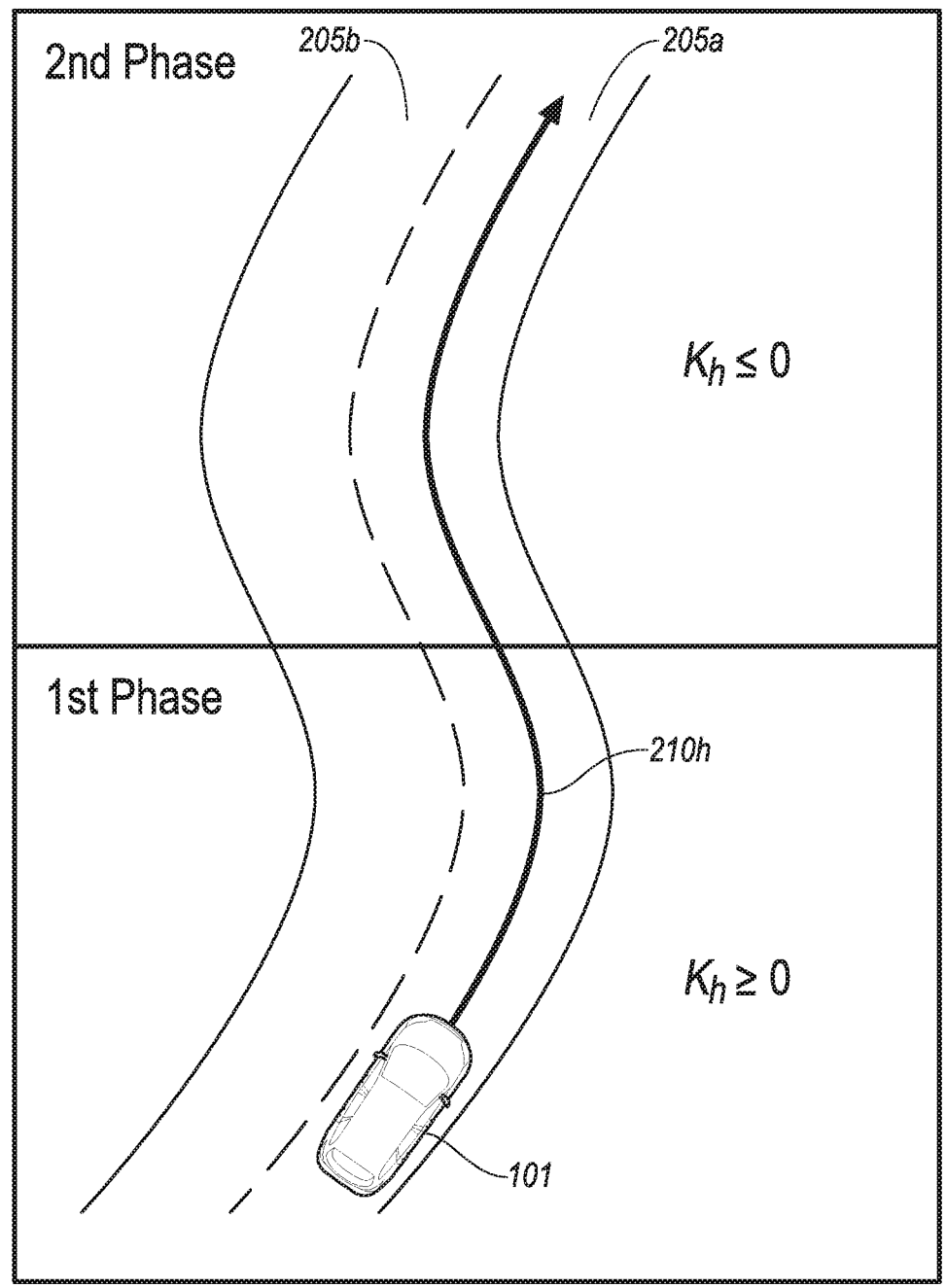
FIG. 5 illustrates the host vehicle in an example intersection.

FIG. 5 illustrates example curvature $K_h$ determinations for the projected path 210h of the host vehicle 101. The roadway lanes 205a, 205b in the example of FIG. 5 have a substantially S-shaped curve, i.e., the curvature $K_h$ changes from a positive value to a negative value. In the example of FIG. 5, a "first phase" indicates a portion of the projected path 210h where the computer 105 determines that the curvature $K_h$ is positive or zero, i.e., $K_h \geq 0$, and a "second phase" where the computer 105 determines that the curvature $K_h$ is negative, i.e., $K_h < 0$. When the computer 105 determines that the sign of the curvature $K_h$ changes, i.e., the value of $K_h$ changes from a positive value to a negative value or from a negative value to a positive value, the computer 105 can determine that the host vehicle 101 is moving in an S-shaped curve. As described below, when the computer 105 determines that the sign of the curvature $K_h$ changes, the computer 105 can determine a threat number for targets 200. As described above in the example of FIG. 3F, the host vehicle 101 remains in the roadway lane 205a along the projected path 210h, and thus the host vehicle 101 does not perform a turn and the computer 105 should not actuate components 120 based on the threat number of the target 200.

Figure 6:
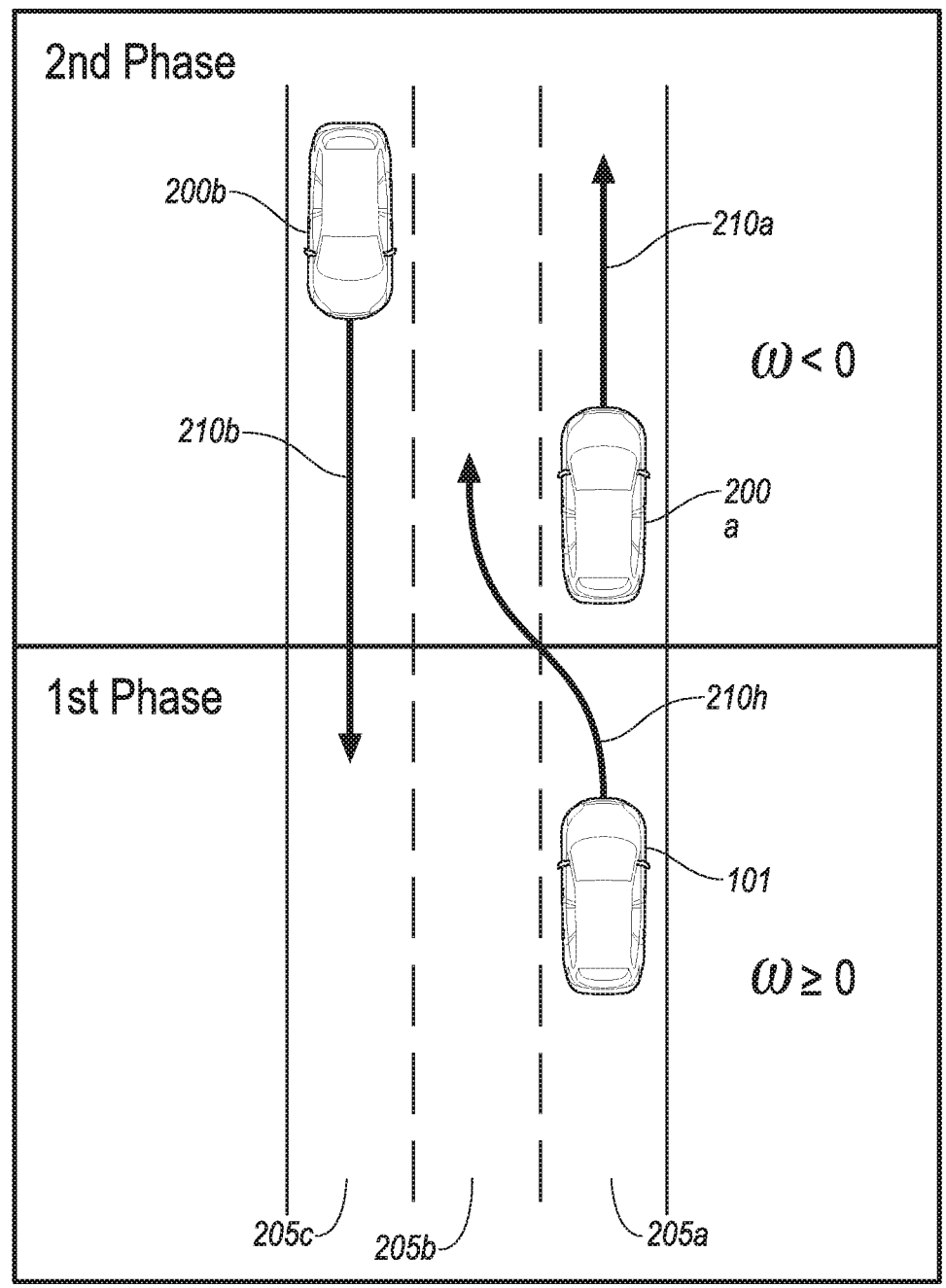
FIG. 6 illustrates the host vehicle in an example intersection.

FIG. 6 illustrates example angular speed ω determinations for the projected path 210h of the host vehicle 101 in the example intersection shown in FIG. 3D. The host vehicle 101 moves from the roadway lane 205a to the roadway lane 205b along the projected path 210h. The steering wheel of the host vehicle 101 would rotate to the left to move the host vehicle 101 into the roadway lane 205b and then rotate to the right to move the host vehicle 101 straight in the roadway lane 205b. Thus, the angular speed ω changes as the host vehicle 101 moves into the roadway lane 205b. In the example of FIG. 6, the computer 105 determines a "first phase" indicating a portion of the projected path 210h in which the computer 105 determines that the angular speed ω is positive or zero, i.e., ω≥0, and a "second phase" indicating a portion of the projected path 210h in which the computer 105 determines that the angular speed ω is negative, i.e., ω<0. As described below, when the computer 105 determines that the angular speed ω changes sign, i.e., from a positive value to a negative value or from a negative value to a positive value, the computer 105 can determine that the host vehicle 101 is moving from the roadway lane 205a to the roadway lane 205b. Thus, the computer 105 can determine that the host vehicle 101 is not performing a turn and not to actuate components 120 based on the threat numbers of the targets 200a, 200b.

Figure 7:
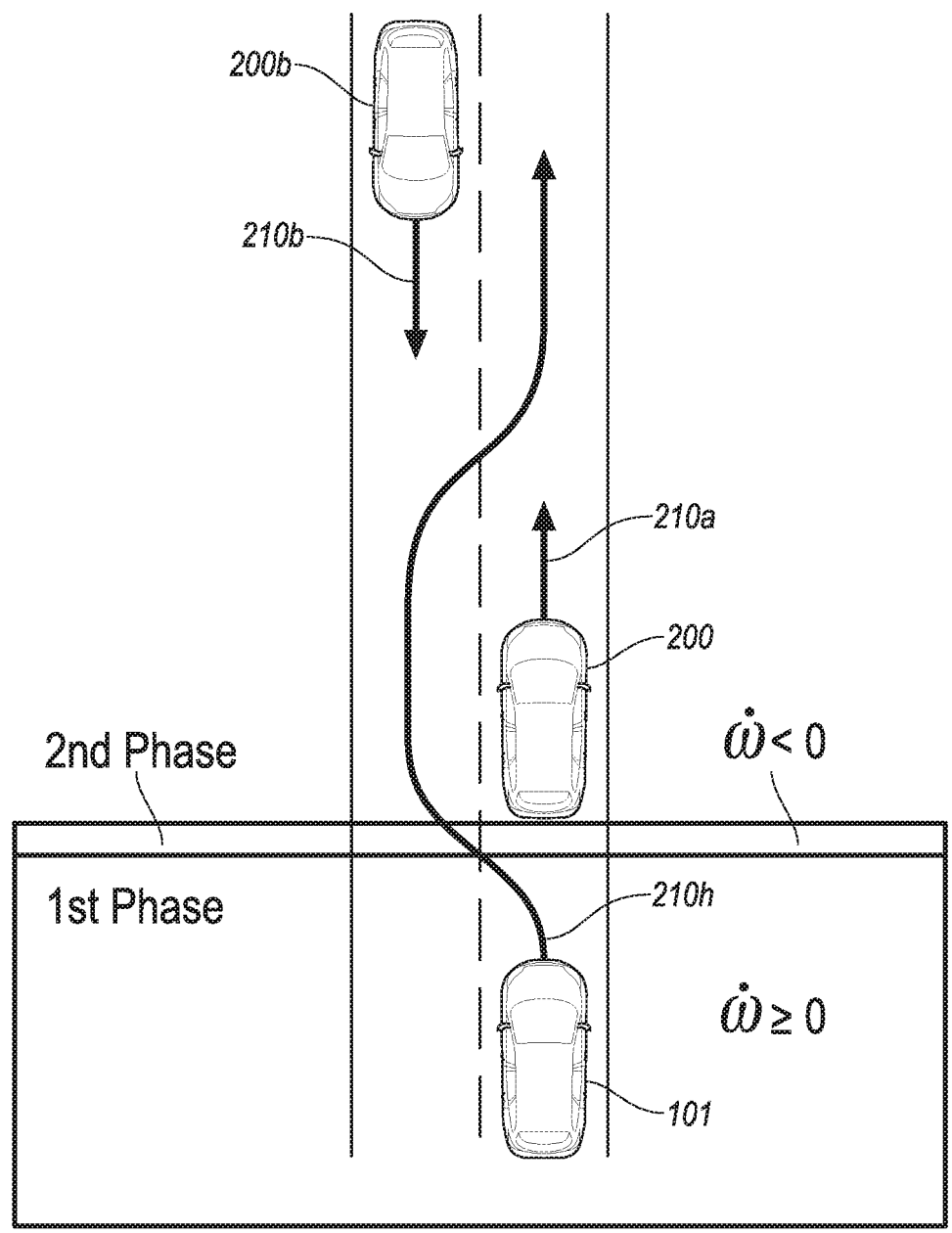
FIG. 7 illustrates the host vehicle in an example intersection.

FIG. 7 illustrates example angular acceleration $\dot{\omega}$ determinations for the projected path 210h of the host vehicle 101 in the example intersection shown in FIG. 3E. The host vehicle 101 can move along the projected path 210h from the roadway lane 205a into the roadway lane 205b and then into the roadway lane 205a, passing the first target 200a and moving toward the second target 200b. In the example of FIG. 7, the computer 105 determines a "first phase" indicating a portion of the projected path 210h in which the computer 105 determines that the angular acceleration $\dot{\omega}$ is positive or zero, i.e., $\dot{\omega}$≥0, and a "second phase" indicating a portion of the projected path 210h in which the computer 105 determines that the angular acceleration $\dot{\omega}$ is negative, i.e., $\dot{\omega}$<0. As described below, when the computer 105 can determine that when the angular acceleration $\dot{\omega}$ changes sign, i.e., from a positive value to a negative value or from a negative value to a positive value, that the host vehicle 101 is passing a target 200. Thus, the computer 105 can determine that the host vehicle 101 is not performing a turn and not to actuate components 120 based on the threat numbers of the targets 200a, 200b.

Figure 8:
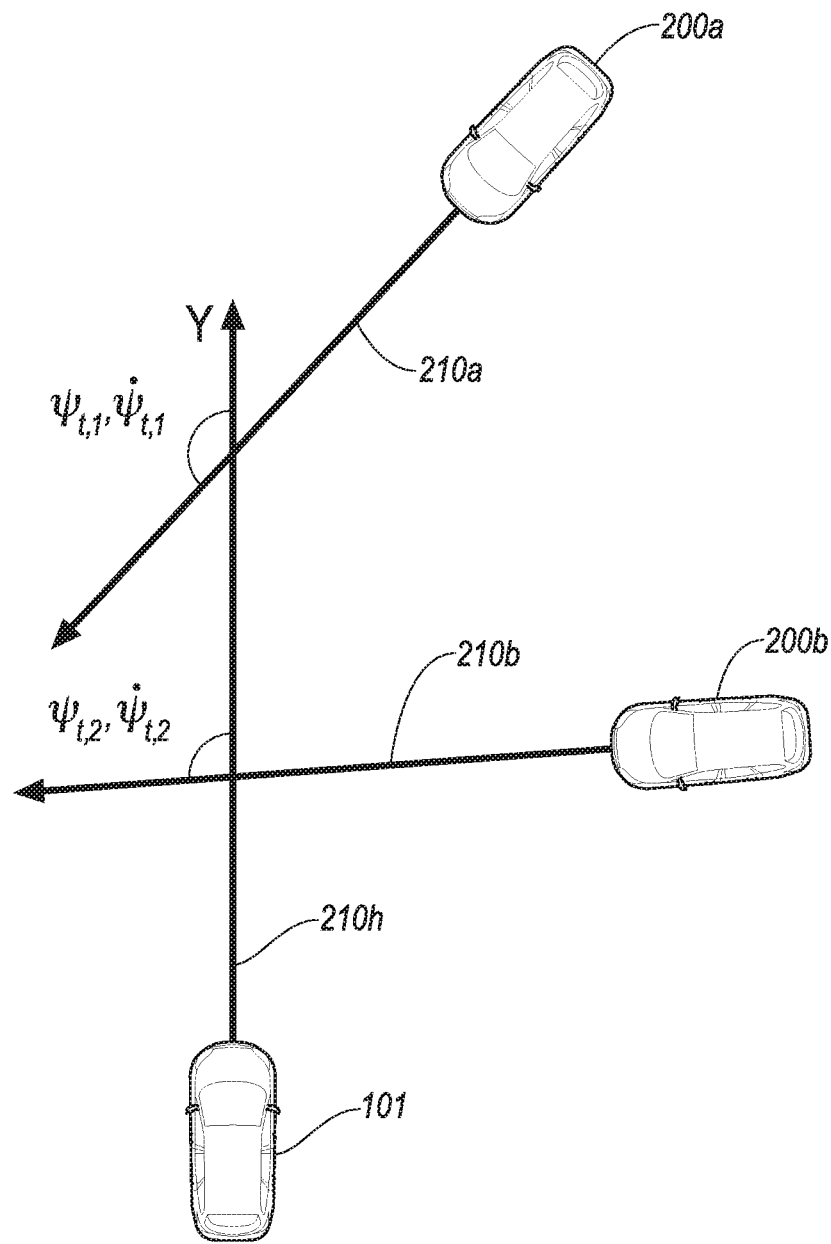
FIG. 8 illustrates the host vehicle taking measurement from a plurality of targets.

FIG. 8 illustrates an example intersection in which the computer 105 determines a heading angle $\psi_t$ and a heading angle rate $$\dot{\psi}_t = \frac{d\psi_t}{dt}$$

for a first target 200a and a second target 200b. The computer 105 can determine a heading angle $\psi_t$ defined between the projected path 210h of the host vehicle 101 and a target 200. In the example of FIG. 8, the computer 105 can determine a first heading angle $\psi_{t,1}$ and a first heading angle rate $\dot{\psi}_{t,1}$ between the projected path 210h of the host vehicle 101 and a projected path 210a of the first target 200a. The computer 105 can determine a second heading angle $\psi_{t,2}$ and a second heading angle rate $\dot{\psi}_{t,2}$ between the projected path 210h of the host vehicle 101 and a projected path 210b of the second target 200b. As described below, based on the heading angle $\psi_t$ and the heading angle rate $\dot{\psi}_t$, the computer 105 can determine whether to actuate components 120 based on the threat numbers of the targets 200a, 200b.

The computer 105 can determine a threat number $TN_m$ for each target 200. A threat number is a prediction of whether a specific target 200 will intersect or collide with the host vehicle 101. As used herein, the symbol m is an index that is a natural number and identifies one of the targets 200, and the symbol M is a natural number that indicates the total number of targets 200 identified by the computer 105. Thus, the threat number $TN_m$ is the threat number for the specific target 200 indicated by the index m. Specifically, the computer 105 may determine the acceleration threat number ATN, the brake threat number BTN, and the steering threat number STN for the host vehicle 101 and the target 200, and based on the threat numbers ATN, BTN, STN, which may be combined into a single threat number TN, to actuate components 120.

The BTN is a measure of a needed longitudinal deceleration to allow the host vehicle 101 to stop before colliding with the target 200. The BTN can be based on a measured host vehicle 101 speed, a distance between the target 200 and the host vehicle 101, and the projected paths 210h, 210a. The computer 105 can determine a longitudinal deceleration to stop the host vehicle 101 before colliding with the target 200, e.g., 2 m/s². The computer 105 can determine a maximum deceleration of the host vehicle 101, e.g., 8 m/s². The BTN can be the ratio of the needed deceleration to the maximum deceleration, e.g., BTN=2/8=0.25. If the needed deceleration to avoid a collision with the target 200 exceeds the maximum deceleration of the host vehicle 101, i.e., BTN>1, then the computer 105 can set the value of the BTN to 1, i.e., if BTN>1, BTN=1.

The STN is a measure of a needed lateral acceleration to allow the host vehicle 101 to steer away from the target 200. As with the BTN, the computer 105 can determine a needed lateral acceleration to avoid a collision between the host vehicle 101 and the target 200. The STN can be the ratio of the needed lateral acceleration to a maximum lateral acceleration of the host vehicle 101. If the needed lateral acceleration exceeds the maximum lateral acceleration, the computer 105 can set the STN to 1.

The ATN is a measure of a needed longitudinal acceleration to allow the host vehicle 101 to accelerate and pass the target 200. As described above for the BTN and the STN, the computer 105 can determine a needed acceleration to allow the host vehicle 101 to pass the target 200 and a maximum available acceleration of the host vehicle 101. The ATN can be the ratio of the needed longitudinal acceleration to the maximum longitudinal acceleration of the host vehicle 101. If the needed longitudinal acceleration exceeds a maximum longitudinal acceleration, the computer 105 can set the ATN to 1. The computer 105 may determine the STN, BTN, and/or ATN to produce a respective threat number $TN_m$ for each target 200.

The computer 105 can determine the threat number $TN_m$ based on the predicted trajectories of the host vehicle 101 and the target 200. That is, based on the position, velocity, acceleration, and turn rate of the host vehicle 101 and the target 200, the computer 105 can determine the threat number $TN_m$ for the target 200. In one non-limiting example, the BTN, STN, and ATN can be determined in a manner described in U.S. patent application Ser. No. 15/005,037, Pub. No. 2016/0362104, filed Jan. 25, 2016, which is incorporated herein by reference in its entirety. Other techniques for determining threat numbers $TN_m$ could alternatively be used, e.g., the threat number may be a ratio of a required deceleration to stop the target 200 prior to entering the host vehicle path 210*h* (i.e., a "zero-range" deceleration) to a predetermined maximum deceleration of the target 200.

The computer 105 can determine the overall threat number TN as the maximum value of threat numbers $TN_1$, $TN_2, \ldots, TN_m$, i.e. the respective threat numbers of the M targets 200. However, as described below, the computer 105 can determine that one or more targets 200 have a low probability of a collision with the host vehicle 101, and the computer 105 can exclude those targets 200 from further threat analysis and collision avoidance and mitigation. The computer 105 can determine a plurality of indicators $\xi$, each indicator being a Boolean value of either 0 or 1, based on the curvature $K_h$, the angular speed $\omega$, the angular acceleration $\dot\omega$, the heading angle $\psi_r$, and the heading angle rate $\dot\psi_r$. As used herein, an "indicator" is a value that indicates, whether the host vehicle 101 is in an intersection that is not an OCTAP scenario. Thus, based on the indicators $\xi$, the computer 105 can determine whether a specific target 200 should be considered for further threat analysis or removed from further threat analysis. When at least one of the indicators $\xi=1$, the computer 105 can reduce the threat number $TN_m$ for the m target 200 to 0, excluding the target 200 from further threat analysis and collision avoidance and mitigation. For example, the computer 105 can determine 5 indicators $\xi_1, \xi_2, \xi_3, \xi_4, \xi_5$ and determine the overall threat number TN based on the threat numbers $TN_m$:

$$TN(t) = \max_{m=1,\ldots,M}\left(TN_m(t) \cdot \prod_{j=1}^{5}(1-\xi_j(t))\right) \quad (3)$$

The computer 105 can actuate one or more vehicle components 120 based on the threat number TN, e.g., when the threat number TN is above a predetermined threat number threshold. The computer 105 can actuate one or more components 120 based on a comparison of the threat number to a plurality of thresholds. For example, if the threat number TN is above 0.7, the computer 105 can actuate a brake 120 to decelerate the host vehicle 101, e.g., at −6.5 meters per second squared (m/s²). In another example, if the threat number TN is above 0.4 but less than or equal to 0.7, the computer 105 can actuate the brake 120 to, e.g., a deceleration of −2.0 m/s². In another example, if the threat number TN is greater than 0.2 but less than or equal to 0.4, the computer 105 can display a visual warning on a host vehicle 101 human-machine interface and/or play an audio warning over a speaker.

The computer 105 can determine a first indicator $\xi_1$ based on a curvature $K_h$. The computer 105 can use the first indicator $\xi_1$ to determine whether the host vehicle 101 is in an S-curve as shown in FIG. 5. Specifically, the first indicator $\xi_1$ can indicate whether the host vehicle 101 is in the second phase of the S-curve and whether the computer 105 should actuate components 120 to avoid targets 200. The computer 105 can determine intermediate indicators $\xi_{1a}$, $\xi_{1b}, \xi_{1c}, \xi_{1d}, \xi_{1e}, \xi_{1f}$ to indicate current movement of the host vehicle 101 at a time t:

$$\xi_{1a}(t) = \begin{cases} 1 & \text{if } K_h(t) > \overline{\delta_{K_h}} \\ 0 & \text{otherwise} \end{cases} \quad (4)$$

$$\xi_{1b}(t) = \begin{cases} 1 & \text{if } K_h(t) > \underline{\delta_{K_h}} \\ 0 & \text{otherwise} \end{cases} \quad (5)$$

$$\xi_{1c}(t) = \begin{cases} 1 & \text{if } (\xi_{1a}(t) + \xi_{1b}(t) + \xi_{1c}(t-\Delta t)) \geq 2 \\ 0 & \text{otherwise} \end{cases} \quad (6)$$

$$\xi_{1d}(t) = \begin{cases} 1 & \text{if } K_h(t) < -\overline{\delta_{K_h}} \\ 0 & \text{otherwise} \end{cases} \quad (7)$$

$$\xi_{1e}(t) = \begin{cases} 1 & \text{if } K_h(t) < -\underline{\delta_{K_h}} \\ 0 & \text{otherwise} \end{cases} \quad (8)$$

$$\xi_{1f}(t) = \begin{cases} 1 & \text{if } (\xi_{1d}(t) + \xi_{1e}(t) + \xi_{1f}(t-\Delta t)) \geq 2 \\ 0 & \text{otherwise} \end{cases} \quad (9)$$

where $\Delta t$ is a predetermined time step, $\overline{\delta_{K_h}}$ is an upper limit of the curvature $K_h$ determined based on an OCTAP intersection and stored in the data store 106 and/or the server 130, and $\underline{\delta_{K_h}}$ is a lower limit of the curvature $K_h$ determined based on the OCTAP intersection and stored in the data store 106 and/or the server 130. The upper limit $\overline{\delta_{K_h}}$ and the lower limit $\underline{\delta_{K_h}}$ can be determined based on curvature $K_h$ calculations of a predetermined OCTAP intersection, e.g., $\underline{\delta_{K_h}}=0.015$, $\overline{\delta_{K_h}}=0.010$. If $\xi_{1c}(t)=1$, the host vehicle 101 is moving in a curve to the left. If $\xi_{1f}(t)=1$, the host vehicle 101 is moving in a curve to the right.

Based on the intermediate indicators $\xi_{1c}$, $\xi_{1f}$, the computer 105 can determine whether the host vehicle 101 is exiting the current curve:

$$\xi_{1g}(t) = \begin{cases} 1 & \text{if } \xi_{1c}(t) < \xi_{1c}(t-\Delta t) \\ 0 & \text{otherwise} \end{cases} \quad (10)$$

$$\xi_{1h}(t) = \begin{cases} 1 & \text{if } \xi_{1f}(t) < \xi_{1f}(t-\Delta t) \\ 0 & \text{otherwise} \end{cases} \quad (11)$$

where $\xi_{1g}=1$ when the host vehicle 101 is no longer in a leftward curve, and $\xi_{1h}=1$ when the host vehicle 101 is no longer in a rightward curve. Based on the change in the indicators $\xi_{1g}$, $\xi_{1h}$, the computer 105 can determine the indicator $\xi_1$ and whether the host vehicle 101 is in an S-curve:

$$\xi_{1i}(t) = \begin{cases} 1 & \text{if } (\xi_{1g}(t) = 1 \text{ and } \xi_{1h}(t) = 0) \\ 0 & \text{if } (\xi_{1g}(t) = 0 \text{ and } \xi_{1h}(t) = 1) \text{ or} \\ & \phantom{\text{if }}(\xi_{1g}(t) = 1 \text{ and } \xi_{1h}(t) = 1) \\ \xi_{1i}(t-\Delta t) & \text{otherwise} \end{cases} \quad (12)$$

$$\xi_1(t) = \begin{cases} 1 & \text{if } |K_h(t)| > \overline{\delta_{K_h}} \text{ and } K_h(t) > 0 \text{ and } \xi_{1i}(t) = 1 \\ 1 & \text{if } |K_h(t)| > \overline{\delta_{K_h}} \text{ and } K_h(t) \leq 0 \text{ and } \xi_{1i}(t) = 0 \\ 0 & \text{otherwise} \end{cases} \quad (13)$$

When $\xi_{1g}(t)=1$, the host vehicle 101 is not in an OCTAP intersection, and the computer 105 can reduce the threat numbers TN of identified targets 200 to 0, as shown in Equation (3). Thus, the computer 105 can determine not to actuate components 120 based on the targets 200.

The computer 105 can, upon determining $\xi_1(t)=1$, then start a timer to measure a time elapsed since determining $\xi_1(t)=1$. If the time elapsed since determining $\xi_1(t)=1$ exceeds a predetermined time threshold $T_d$, i.e., $\xi_1(t+T_d)=1$, the computer 105 can determine that the host vehicle 101 is not in an OCTAP intersection and reduce the threat number TN of identified targets 200 to 0, as shown in Equation (3).

The time threshold $T_d$ can be determined based on empirical data from an OCTAP intersection and an S-curve, and can be determined as a period of time beyond which the determination of $\xi_1(t)=1$ indicates an S-curve and not a momentary change in $K_h$. The time threshold $T_d$ can be, e.g., 2.5 seconds.

The computer 105 can determine a second indicator $\xi_2$ based on a current angular speed $\omega(t)$. The computer 105 can use the second indicator $\xi_2$ to determine whether the host vehicle 101 is in a roadway lane 205 change as shown in FIG. 6. Specifically, the second indicator $\xi_2$ can indicate whether the host vehicle 101 is in the second phase of the roadway lane 205 change and whether the computer 105 should actuate components 120 to avoid targets 200. The computer 105 can determine intermediate indicators $\xi_{2a}$, $\xi_{2b}$, $\xi_{2c}$, $\xi_{2d}$, $\xi_{2e}$ to indicate current movement of the host vehicle 101 at a time t:

$$\xi_{2a}(t) = \begin{cases} 1 & \text{if } |\omega_h(t)| > \overline{\delta_{\omega_h}} \\ 0 & \text{otherwise} \end{cases} \quad (14)$$

$$\xi_{2b}(t) = \begin{cases} 1 & \text{if } |\omega_h(t)| > \underline{\delta_{\omega_h}} \\ 0 & \text{otherwise} \end{cases} \quad (15)$$

$$\xi_{2c}(t) = \begin{cases} 1 & \text{if } (\xi_{2a}(t) + \xi_{2b}(t) + \xi_{2c}(t - \Delta t)) \geq 2 \\ 0 & \text{otherwise} \end{cases} \quad (16)$$

$$\xi_{2d}(t) = \begin{cases} 1 & \text{if } \xi_{2c}(t) < \xi_{2c}(t - \Delta t) \\ 0 & \text{otherwise} \end{cases} \quad (17)$$

$$\xi_{2e}(t) = \begin{cases} 1 & \text{if } \xi_{2c}(t) > \xi_{2c}(t - \Delta t) \\ 0 & \text{otherwise} \end{cases} \quad (18)$$

$$\xi_2(t) = \begin{cases} 1 & \text{if } (\xi_{2d}(t) = 1 \text{ and } \xi_{2e}(t) = 0) \\ 0 & \text{if } (\xi_{2d}(t) = 0 \text{ and } \xi_{2e}(t) = 1) \text{ or } \\ & (\xi_{2d}(t) = 1 \text{ and } \xi_{2e}(t) = 1) \\ \xi_2(t - \Delta t) & \text{otherwise} \end{cases} \quad (19)$$

where $\Delta t$ is a predetermined time step, $\overline{\delta_{\omega_h}}$ is an upper limit of the angular speed $\omega$ determined based on an OCTAP intersection and stored in the data store 106 and/or the server 130, and $\underline{\delta_{\omega_h}}$ is a lower limit of the angular speed $\omega$ determined based on the OCTAP intersection and stored in the data store 106 and/or the server 130. The upper limit $\overline{\delta_{\omega_h}}$ and the lower limit $\underline{\delta_{\omega_h}}$ can be determined based on angular speed $\omega$ calculations of a predetermined OCTAP intersection, e.g., $\overline{\delta_{\omega_h}}=0.12$, $\underline{\delta_{\omega_h}}=0.008$. If $\xi_d(t)=1$, the host vehicle 101 is finishing a turn and is in a new roadway lane 205. If $\xi_{2e}(t)=1$, the host vehicle 101 is starting a turn and is about to move to a new roadway lane 205. Thus, the computer 105 can determine whether the host vehicle 101 is in a roadway lane 205 change intersection and can accordingly reduce the threat numbers TN of one or more targets 200 to 0 as described above in Equation (3). As described above, the computer 105 can determine if the second indicator $\xi_2(t)=1$ for a predetermined time threshold $T_d$, determined based on a predetermined OCTAP intersection and a roadway lane 205 change intersection described in FIG. 6.

The computer 105 can determine a third indicator $\xi_3$ based on the angular acceleration $\dot{\omega}$. The computer 105 can use the third indicator $\xi_3$ to determine whether the host vehicle 101 is in an overtake intersection as shown in FIG. 7. Specifically, the third indicator $\xi_3$ can indicate whether the host vehicle 101 is in the second phase of the overtake intersection, as described above and shown in FIG. 7, and whether the computer 105 should actuate components 120 to avoid targets 200. The computer 105 can determine intermediate indicators $\xi_{3a}$, $\xi_{3b}$, $\xi_{3c}$, $\xi_{3d}$, $\xi_{3e}$, $\xi_{3f}$ to indicate current movement of the host vehicle 101 at a time t:

$$\xi_{3a}(t) = \begin{cases} 0 & \text{if } \dot{\omega}_h(t) < \overline{\delta_{\dot\omega}} \\ 1 & \text{if } \dot{\omega}_h(t) \geq \overline{\delta_{\dot\omega}} \\ \xi_{3a}(t - \Delta t) & \text{otherwise} \end{cases} \quad (20)$$

$$\xi_{3b}(t) = \begin{cases} 0 & \text{if } \dot{\omega}_h(t) > -\overline{\delta_{\dot\omega}} \\ 1 & \text{if } \dot{\omega}_h(t) \leq -\overline{\delta_{\dot\omega}} \\ \xi_{3b}(t - \Delta t) & \text{otherwise} \end{cases} \quad (21)$$

where $\overline{\delta_{\dot\omega}}$ is an upper limit of the angular acceleration $\dot{\omega}$ determined based on an OCTAP intersection and stored in the data store 106 and/or the server 130, and $\underline{\delta_{\dot\omega}}$ is a lower limit of the angular acceleration $\dot{\omega}$ determined based on the OCTAP intersection and stored in the data store 106 and/or the server 130. The upper limit $\overline{\delta_{\dot\omega}}$ and the lower limit $\underline{\delta_{\dot\omega}}$ can be determined based on angular speed $\omega$ calculations of a predetermined OCTAP intersection, e.g., $\overline{\delta_{\dot\omega}}=-0.01$, $\underline{\delta_{\dot\omega}}=-0.05$.

The computer 105 can determine the intermediate indicators $\xi_{3c}$-$\xi_{3f}$ to determine the third indicator $\xi_3$:

$$\xi_{3c}(t) = \begin{cases} 1 & \text{if } \xi_{3a}(t) < \xi_{3a}(t - \Delta t) \\ 0 & \text{otherwise} \end{cases} \quad (22)$$

$$\xi_{3d}(t) = \begin{cases} 1 & \text{if } \xi_{3b}(t) < \xi_{3b}(t - \Delta t) \\ 0 & \text{otherwise} \end{cases} \quad (23)$$

$$\xi_{3e}(t) = \begin{cases} 1 & \text{if } (\xi_{3c}(t) = 1 \text{ and } \xi_{3d}(t) = 0) \\ 0 & \text{if } (\xi_{3c}(t) = 0 \text{ and } \xi_{3d}(t) = 1) \text{ or } \\ & (\xi_{3c}(t) = 1 \text{ and } \xi_{3d}(t) = 1) \\ \xi_{3e}(t - \Delta t) & \text{otherwise} \end{cases} \quad (24)$$

$$\xi_{3f}(t) = \begin{cases} 1 & \text{if } (\xi_{3d}(t) = 1 \text{ and } \xi_{3c}(t) = 0) \\ 0 & \text{if } (\xi_{3d}(t) = 0 \text{ and } \xi_{3c}(t) = 1) \text{ or } \\ & (\xi_{3d}(t) = 1 \text{ and } \xi_{3c}(t) = 1) \\ \xi_{3f}(t - \Delta t) & \text{otherwise} \end{cases} \quad (25)$$

$$\xi_3(t) = (1 - \text{sign}(\dot{\omega}_h(t) + \overline{\delta_{\dot\omega}})) \cdot \xi_{3e}(t) + \text{sign}(\dot{\omega}_h(t) + \overline{\delta_{\dot\omega}}) \cdot \xi_{3f}(t) \quad (26)$$

where the sign( ) function indicates a sign of the input, i.e., whether the input is positive, negative, or zero. That is:

$$\text{sign}(x) = \begin{cases} -1 & \text{if } x < 0 \\ 1 & \text{if } x > 0 \\ 0 & \text{if } x = 0 \end{cases} \quad (27)$$

Thus, the computer 105 can determine whether the host vehicle 101 is in an overtake intersection and should reduce the threat numbers TN of one or more targets 200 to 0 as described above in Equation (3). As described above, the computer 105 can determine if the third indicator $\xi_3(t)=1$ for a predetermined time threshold $T_d$, i.e., $\xi_3(t)=1 \forall t \in [t_0, t_0+T_d]$ where $t_0$ is the time t when the computer 105 first determines that $\xi_3(t)=1$. The time threshold $T_d$ can be determined based on a predetermined OCTAP intersection and an overtake intersection shown in FIG. 7 and described above.

The computer 105 can determine a fourth indicator $\xi_4$ based on the heading angle $\psi_t$ and the heading angle rate $\dot\psi_t$.

The computer 105 can use the fourth indicator $\xi_4$ to determine whether to actuate components 120 based on one or more targets 200:

$$\xi_4(t) = \begin{cases} 0 & \text{if } \sin(\psi_t) \cdot \dot{\psi}_t \leq -\overline{\delta_{\dot{\psi}}} \\ 1 & \text{if } \sin(\psi_t) \cdot \dot{\psi}_t \geq -\underline{\delta_{\dot{\psi}}} \\ \xi_4(t - \Delta t) & \text{otherwise} \end{cases} \quad (28)$$

where $\overline{\delta_{\dot{\psi}}}$ is an upper limit of a heading angle rate $\dot{\psi}_t$ of the target 200 and $\underline{\delta_{\dot{\psi}}}$ is a lower limit of the heading angle rate $\dot{\psi}_t$ of the target 200. The upper limit $\overline{\delta_{\dot{\psi}}}$ and the lower limit $\underline{\delta_{\dot{\psi}}}$ can be determined based on empirical data from an OCTAP intersection and measurements of vehicles 101 and targets 200 in intersection, e.g., $\overline{\delta_{\dot{\psi}}} = -0.01$ and $\overline{\delta_{\dot{\psi}}} = -0.02$. When the fourth indicator $\xi_4 = 1$, the target 200 can have a heading angle rate $\dot{\psi}_t$ that indicates that the target 200 is moving away from the host vehicle 101 and the computer 105 should not actuate components 120 to avoid and/or mitigate a collision with the target 200.

The computer 105 can determine a fifth indicator $\xi_s$ based on the angular speed $\omega$, a distance traveled by the host vehicle S, and the forward speed u. The fifth indicator $\xi_s$ indicates when the host vehicle 101 is moving in a curve (e.g., along a roadway lane 205 that curves), briefly stops moving in the curve (e.g., the roadway lane 205 straightens), and then moves along a curve (e.g., the roadway lane 205 curves again). Specifically, the computer 105 can determine an intermediate indicator $\xi_{5a}$ as follows:

$$t_0 = t \text{ when } \omega(t) > \omega_1 \text{ or } \omega(t) < \omega_2 \quad (29)$$

$$\xi_{5a}(t) = \begin{cases} 1 & \omega_1 < \omega(t) < \omega_2 \\ 0 & \text{otherwise} \end{cases} \quad (30)$$

where $t_0$ is a time start index, $\omega_1$ is a lower limit for the angular speed and $\omega_2$ is an upper limit for the angular speed $\omega$. The limits $\omega_1$, $\omega_2$ can be predetermined values stored in the data store 106 and/or the server 130 determined based on empirical data of an angular speed $\omega$ of the host vehicle 101 on a roadway lane 205.

The computer 105 can then actuate a sensor 110 at the time start index $t_0$ to measure a distance S traveled by the host vehicle 101. The computer 105 can determine the distance S traveled based on, e.g., a forward speed u, geo-coordinate data 115, etc. The computer 105 can determine an intermediate indicator $\xi_{5b}$ based on the distance S:

$$\xi_{5b}(t) = \begin{cases} 1 & \xi_{5a}(t) = 1 \text{ and } S(t) > S_1 \\ 0 & \xi_{5a}(t) = 0 \end{cases} \quad (31)$$

where $S_1$ is a distance threshold based on empirical data of distances of predetermined roadway lanes 205 traveled by the host vehicle 101. The computer 105 can determine a time $t^*$ when $\xi_{5b}(t^*) = 0$ subsequent to determining that $\xi_{5b}(t^* - \Delta t) = 1$. The computer 105 can determine a time $t^{}$ where $\xi_{5b}(t^{}) = 1$ where $t^{**} > t^*$.

The computer 105 can determine the fifth indicator $\xi_5$ based on the intermediate indicators $\xi_{5a}$, $\xi_{5b}$, and a time threshold $T^*$ determined based on empirical data of the host vehicle 101 traveling in a roadway lane 205:

$$\xi_5(t) = 1 \text{ if one of } \begin{cases} \xi_{5b}(t) = 1 \, \forall \, t \in [t^{}, t^{} + T^*] \\ u(t) > u_1 \, \forall \, t > t^* \text{ and } S(t^*) - S(t) < S_2 \\ u(t) < u_2 \text{ for any } t > t^* \end{cases} \quad (32)$$

where $u_1$, $u_2$ are speed thresholds and $S_2$ is a distance threshold, the thresholds determined based on empirical data of the host vehicle 101 traveling in a predetermined roadway lane 205 that curves, straightens, and then curves. When the fifth indicator $\xi_5 = 1$, the computer 105 determines that the host vehicle 101 is not in an OCTAP intersection and determines to reduce the threat numbers TN of the targets 200 to 0.

Figure 9:
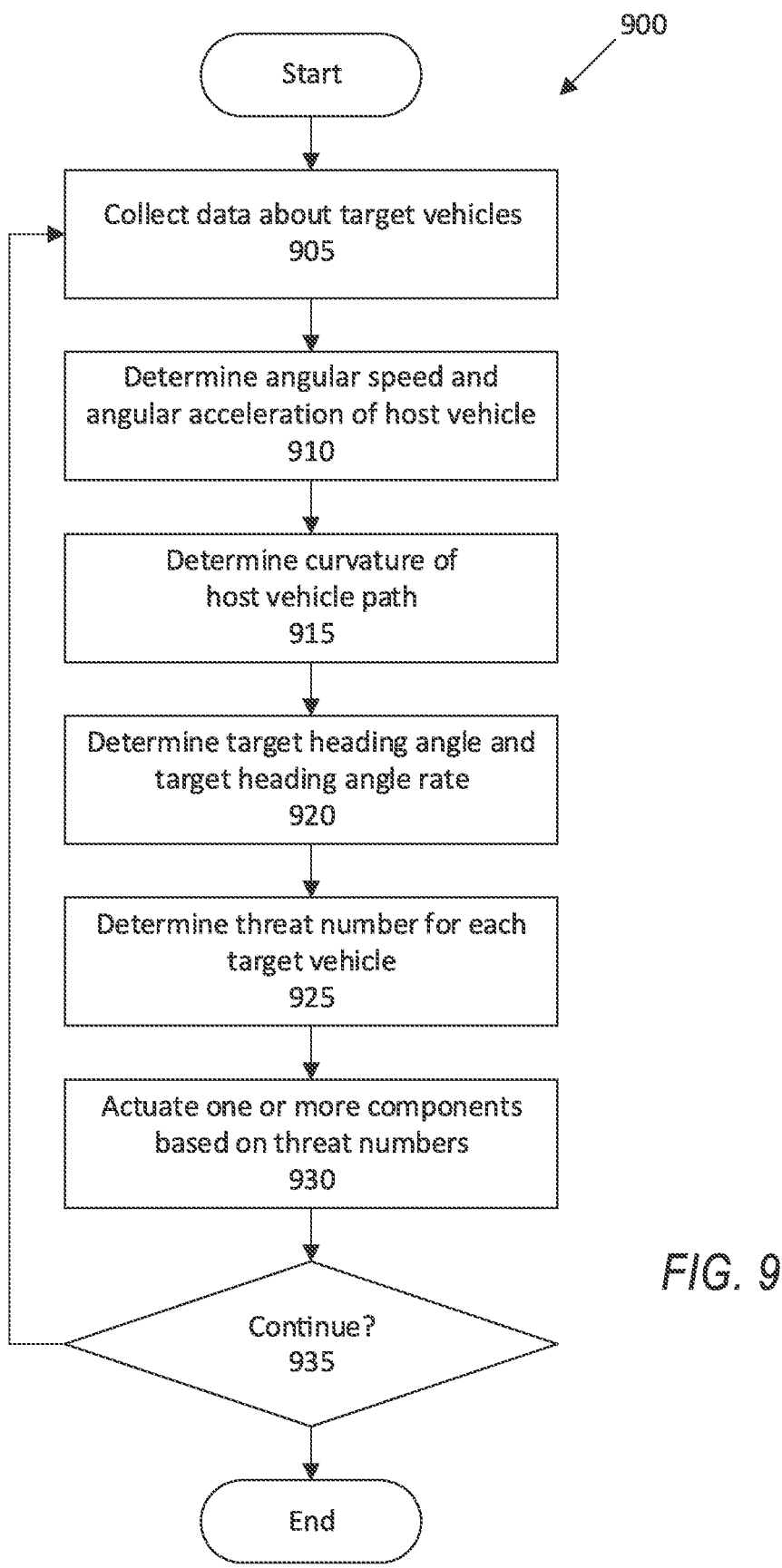
FIG. 9 is a block diagram of an example process for operating the host vehicle in an intersection.

FIG. 9 illustrates an example process 900 for operating a host vehicle 101 in an intersection. The process 900 begins in a block 905, in which the computer 105 collects data 115 from one or more sensors 110 about one or more targets 200. As described above, the computer 105 can determine a projected path 210 for each target 200 based on the collected data 115.

Next, in a block 910, the computer 105 determines an angular speed $\omega$ and an angular acceleration $\dot{\omega}$ of the host vehicle 101. As described above, the computer 105 can, based on the value and/or the sign of the angular speed $\omega$ and/or the angular acceleration $\dot{\omega}$, determine whether to actuate components 120 to avoid one or more of the targets 200.

Next, in a block 915, the computer 105 determines a curvature $K_h(t)$ of the projected path 210h of the host vehicle 101 for a time t. As described above, the computer 105 can, based on the value and/or the sign of the curvature $K_h$, determine whether to actuate components 120 to avoid one or more of the targets 200.

Next, in a block 920, the computer 105 determines a target heading angle $\psi_t$ and a target heading angle rate $\dot{\psi}_t$ for each target 200. As described above, the computer 105 can, based on the target heading angle $\psi_t$ and the target heading angle rate $\dot{\psi}_t$, determine whether to actuate components 120 to avoid one or more of the targets 200.

Next, in a block 925, the computer 105 determines a threat number $TN_m$ for each target 200 and an overall threat number TN. As described above, the threat number $TN_m$ indicates a probability of a collision between the target 200 and the host vehicle 101. The overall threat number TN can be determined based on the threat numbers $TN_m$ for each target 200 and indicators $\xi$ that exclude targets 200 based on the curvature $K_h$, the angular speed $\omega$, the angular acceleration $\dot{\omega}$, the heading angle $\psi_t$, and the heading angle rate $\dot{\psi}_t$.

Next, in a block 930, the computer 105 actuates one or more components 120 in the host vehicle 101 based on the overall threat number TN. As described above, the computer 105 can actuate a brake 120 when the overall threat number TN is above a predetermined threshold, e.g., TN=0.7.

Next, in a block 935, the computer 105 determines whether to continue the process 900. For example, if the host vehicle 101 is moving along the projected path 210h, the computer 105 can continue the process 900 to detect additional targets 200 and perform collision mitigation and/or avoidance for the target 200. If the computer 105 determines to continue, the process 900 returns to the block 905 to collect more data. Otherwise, the process 900 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 900, one or more of the steps could be omitted, or the steps could be executed in a different order than shown in FIG. 9. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   determine respective threat numbers for each of a plurality of targets;
   identify a turn-across path intersection between a host vehicle and at least one of the targets, in which a projected path of the host vehicle turns across a projected path of the at least one of the targets, based on determining a Boolean value for each of a plurality of indicators each identifying an intersection other than the turn-across path intersection, wherein each indicator is determined based on at least one of an angular acceleration of the host vehicle, an angular speed of the host vehicle, a curvature of a trajectory of the host vehicle, or a respective heading angle between each target and the projected path of the host vehicle; and
   actuate a component in the host vehicle based on the threat numbers upon identifying the turn-across path intersection.

2. The system of claim 1, wherein the instructions further include instructions to determine the Boolean value of one of the plurality of indicators based on an angular speed of the host vehicle being between a first threshold and a second threshold and a distance traveled by the host vehicle exceeding a distance threshold, the one indicator identifying the host vehicle is operating along a curve in a roadway lane.

3. The system of claim 1, wherein the instructions further include instructions to determine the Boolean value of one of the plurality of indicators based on, for a respective target, a target heading angle of the respective target and a target heading angle rate of the respective target, the one indicator identifying the host vehicle and the respective target are moving away from each other.

4. The system of claim 1, wherein the instructions further include instructions to actuate a brake in the host vehicle when the threat number is above a threat number threshold.

5. The system of claim 1, wherein the instructions further include instructions to determine the Boolean value of one of the indicators based on a steering wheel angle of the host vehicle and a host vehicle forward speed being below a predetermined forward speed threshold, the one indicator identifying the host vehicle is operating along a curve in a roadway lane.

6. The system of claim 1, wherein the instructions further include instructions to determine the Boolean value of one of the plurality of indicators based on a sign of a first value of the angular acceleration and a sign of a subsequent value of the angular acceleration, the one indicator identifying the intersection other than a turn-across path intersection when the sign of the first value of the angular acceleration differs from the sign of the subsequent value of the angular acceleration.

7. A system, comprising:
   a host vehicle;
   means for determining respective threat numbers for each of a plurality of targets;
   means for identifying a turn-across path intersection between a host vehicle and at least one of the targets, in which a projected path of the host vehicle turns across a projected path of the at least one of the targets, based on determining a Boolean value for each of a plurality of indicators each identifying an intersection other than the turn-across path intersection, wherein each indicator is determined based on at least one of an angular acceleration of the host vehicle, an angular speed of the host vehicle, a curvature of a trajectory of the host vehicle, or a respective heading angle between each target and the projected path of the host vehicle; and means for braking the host vehicle based on the threat numbers upon identifying the turn-across path intersection.

8. The system of claim 7, further comprising means for determining that the host vehicle is leaving a current roadway lane based on a forward speed of the host vehicle and the angular speed.

9. A method, comprising:
determining respective threat numbers for each of a plurality of targets;
identifying a turn-across path intersection between a host vehicle and at least one of the targets, in which a projected path of the host vehicle turns across a projected path of the at least one of the targets, based on determining a Boolean value for each of a plurality of indicators each identifying an intersection other than the turn-across path intersection, wherein each indicator is determined based on at least one of an angular acceleration of the host vehicle, an angular speed of the host vehicle, a curvature of a trajectory of the host vehicle, or a respective heading angle between each target and the projected path of the host vehicle; and
actuating a component in the host vehicle based on the threat numbers upon identifying the turn-across path intersection.

10. The method of claim 9, further comprising determining the threat number for each of the targets based on an angular speed of the host vehicle.

11. The method of claim 9, further comprising determining the threat number for each of the targets based on, for a respective target, at least one of a respective target heading angle for the respective target and a target heading angle rate of the respective target.

12. The method of claim 9, further comprising actuating a brake in the host vehicle when the threat number is above a threat number threshold.

13. The method of claim 9, further comprising determining the Boolean value of one of the indicators based on a steering wheel angle of the host vehicle and a host vehicle forward speed being below a predetermined forward speed threshold, the one indicator identifying the host vehicle is operating along a curve in a roadway lane.

14. The method of claim 9, further comprising determining the Boolean value of one of the plurality of indicators based on a sign of a first value of the angular acceleration differs from a sign of a subsequent value of the angular acceleration, the one indicator identifying the intersection other than a turn-across path intersection when the sign of the first value of the angular acceleration differs from the sign of the subsequent value of the angular acceleration.

15. The system of claim 1, wherein the instructions further include instructions to determine the Boolean value of one of the indicators based on a curvature of a roadway lane, the one indicator identifying the intersection other than a turn-across path intersection when the curvature of the roadway lane is one of a leftward curve, a rightward curve, or an S-curve.

16. The system of claim 1, wherein the instructions further include instructions to determine the Boolean value or the absence of a first indicator based on the curvature of the trajectory of the host vehicle, a second indicator based on the angular speed of the host vehicle, a third indicator based on the angular acceleration of the host vehicle, a fourth indicator based on a respective heading angle between each target and a projected path of the host vehicle, and a fifth indicator based on a forward speed of the host vehicle.

17. The system of claim 1, wherein the plurality of indicators include a first indicator identifying an S-curve intersection, a second indicator identifying a lane change intersection, a third indicator identifying an overtake intersection, a fourth indicator identifying a diverging intersection, and a fifth indicator identifying a deviation curve intersection.

18. The system of claim 17, wherein the instructions further include instructions to:
determine the Boolean value for the first indicator based on at least the curvature of a trajectory of the host vehicle;
determine the Boolean value for the second indicator based on at least the angular speed of the host vehicle;
determine the Boolean value for the third indicator based on at least the angular acceleration of the host vehicle;
determine the Boolean value for the fourth indicator based on at least the heading angle between each target and the projected path of the host vehicle; and
determine the Boolean value for the fifth indicator based on at least the angular speed of the host vehicle.

19. The method of claim 9, wherein the plurality of indicators include a first indicator identifying an S-curve intersection, a second indicator identifying a lane change intersection, a third indicator identifying an overtake intersection, a fourth indicator identifying a diverging intersection, and a fifth indicator identifying a deviation curve intersection.

20. The method of claim 19, further comprising:
determining the Boolean value for the first indicator based on at least the curvature of a trajectory of the host vehicle;
determining the Boolean value for the second indicator based on at least the angular speed of the host vehicle;
determining the Boolean value for the third indicator based on at least the angular acceleration of the host vehicle;
determining the Boolean value for the fourth indicator based on at least the heading angle between each target and the projected path of the host vehicle; and
determining the Boolean value for the fifth indicator based on at least the angular speed of the host vehicle.

\* \* \* \* \*